United States Patent
Banin et al.

(10) Patent No.: US 9,055,523 B2
(45) Date of Patent: Jun. 9, 2015

(54) APPARATUS, SYSTEM AND METHOD OF CALIBRATING A RADIO DELAY OF A WIRELESS DEVICE

(71) Applicant: Intel Corporation, Santa Clara, CA (US)

(72) Inventors: Leor Banin, Petach Tikva (IL); Yuval Amizur, Kfar-Saba (IL); Uri Schatzberg, Kiryat Ono (IL)

(73) Assignee: INTEL CORPORATION, Santa Clara, CA (US)

( * ) Notice: Subject to any disclaimer, the term of this patent is extended or adjusted under 35 U.S.C. 154(b) by 236 days.

(21) Appl. No.: 13/691,801

(22) Filed: Dec. 2, 2012

(65) Prior Publication Data

US 2014/0154996 A1 Jun. 5, 2014

(51) Int. Cl.
| | |
|---|---|
| H04B 17/00 | (2006.01) |
| H04W 56/00 | (2009.01) |
| G01S 5/02 | (2010.01) |
| G01S 5/14 | (2006.01) |
| G01S 13/76 | (2006.01) |

(52) U.S. Cl.
CPC ............... *H04W 56/00* (2013.01); *G01S 5/021* (2013.01); *G01S 5/14* (2013.01); *G01S 13/765* (2013.01)

(58) Field of Classification Search
CPC .................................................... H04W 64/00
USPC ............ 455/67.11, 68, 456.1, 456.5; 370/281
See application file for complete search history.

(56) References Cited

U.S. PATENT DOCUMENTS

| | | |
|---|---|---|
| 2004/0056210 A1 | 3/2004 | Scherer |
| 2008/0186136 A1 | 8/2008 | Raphaeli et al. |
| 2009/0270042 A1 | 10/2009 | Miscopein et al. |
| 2010/0190509 A1* | 7/2010 | Davis .......................... 455/456.1 |
| 2011/0170463 A1* | 7/2011 | Aryan et al. ................... 370/281 |

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.
IEEE Std 802.11™—2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012.
Wi-Fi Alliance Technical Committee P2P Task Group. Wi-Fi Peer-to-Peer (P2P) Technical Specification. Version 1.2; 160 pages; Dec. 14, 2011.
International Search Report and Written Opinion for PCT Patent Application No. PCT/US2013/048080, mailed on Sep. 26, 2013, 14 pages.

* cited by examiner

*Primary Examiner* — Tuan H Nguyen
(74) *Attorney, Agent, or Firm* — Shichrur & Co.

(57) ABSTRACT

Some demonstrative embodiments include devices, systems and/or methods of calibrating a radio delay. For example, a radio delay calibrator may calibrate at least one radio delay of a radio of a wireless communication device based on one or more calibration messages received by the wireless communication device from one or more other wireless communication devices, the calibration messages including calibration information, which is based on radio delays of the one or more other wireless communication devices.

24 Claims, 6 Drawing Sheets

APPARATUS, SYSTEM AND METHOD OF CALIBRATING A RADIO DELAY OF A WIRELESS DEVICE

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the filed of outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) or Round Time Trip (RTT) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

The first station may determine a relative location of the first station with respect to the second station based on the calculated distance.

An estimated location of the first station may be determined by calculating two or more distances between the first station and two or more other stations, e.g., other APs, and determining the estimated location based on the distances by utilizing a suitable method, e.g., a trilateration method.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., combining cellular phone functionalities with PDA device functionalities), a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks— Specific requirements Part* 11: *Wireless LAN Medium Access Control* (*MAC*) *and Physical Layer* (*PHY*) *Specifications, Mar.* 29, 2012; IEEE802.11 task group ac (TGac)

("*IEEE*802.11-09/0308*r*12—*TGac Channel Model Addendum Document*"); IEEE 802.11 *task group ad* (*TGad*) (*IEEE P802.11ad Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 5: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Figure 1:
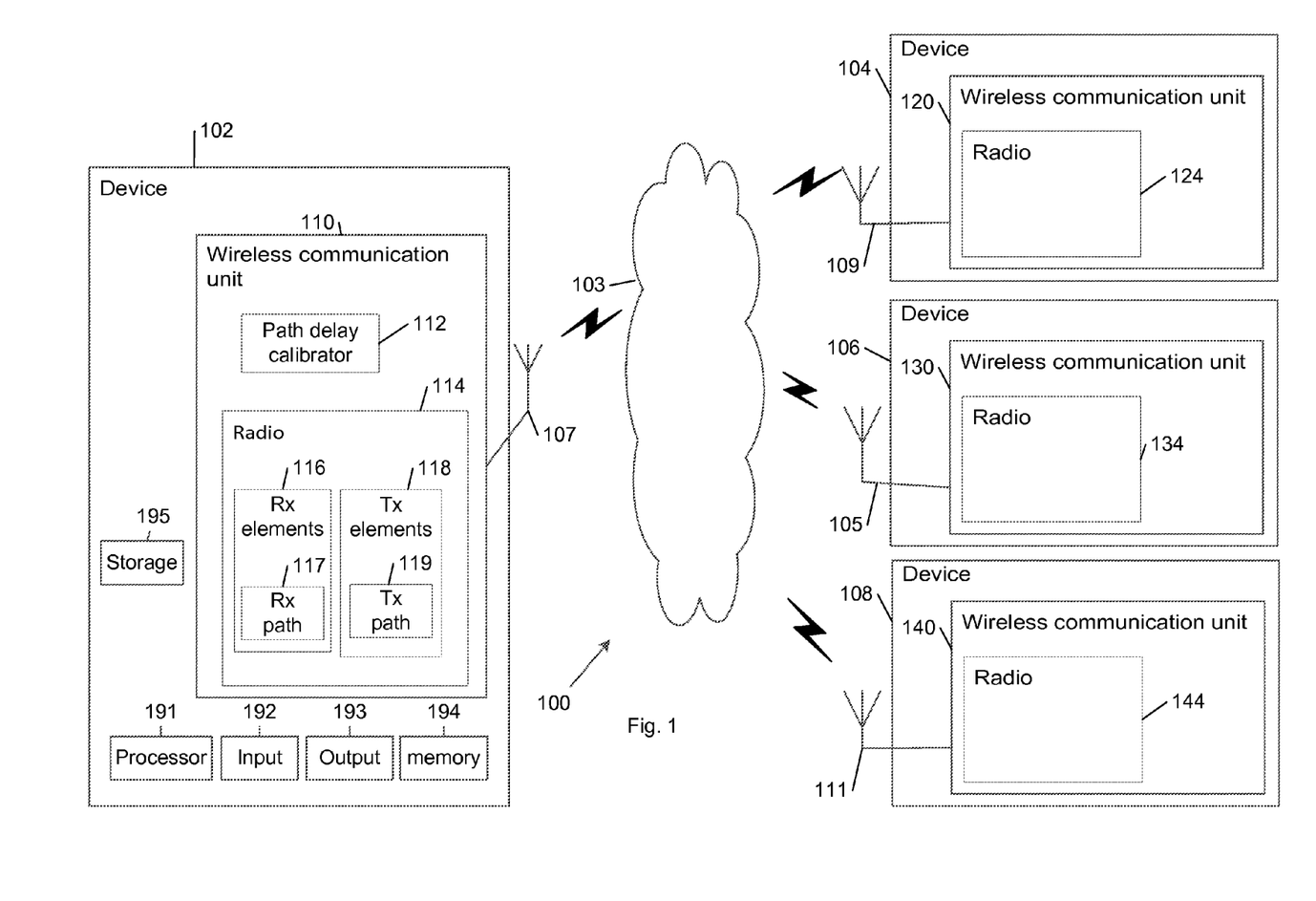
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102, 104, 106 and/or 108, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102, 104, 106 and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device, a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102, 104, 106 and/or 108 may include wireless communication units, to perform wireless communication between wireless communication devices 102, 104, 106, and/or 108 and/or with one or more other wireless communication devices. For example, device 102 may include a wireless communication unit 110, device 104 may include a wireless communication unit 120, device 106 may include a wireless communication unit 130 and/or device 108 may include a wireless communication unit 140, e.g., as described below.

Wireless communication devices 102, 104, 106 and/or 108 may also include, for example, one or more of a processor 191, an input unit 192, an output unit 193, a memory unit 194, and a storage unit 195. Wireless communication devices 102, 104, 106 and/or 108 may optionally include other suitable hardware components and/or software components. In some demonstrative embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102, 104, 106 and/or 108 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102, 104, 106 and/or 108.

In some demonstrative embodiments, wireless communication units 110, 120, 130 and/or 140 may include, or may be associated with, one or more antennas 107, 109, 105 and/or 111, respectively. Antennas 107, 109, 105 and/or 111 may include any type of antennas suitable for transmitting and/or receiving wireless communication signals, blocks, frames, transmission streams, packets, messages and/or data. For example, antennas 107, 109, 105 and/or 111 may include any suitable configuration, structure and/or arrangement of one or more antenna elements, components, units, assemblies and/or arrays. Antennas 107, 109, 105 and/or 111 may include, for example, antennas suitable for directional communication, e.g., using beamforming techniques. For example, antennas 107, 109, 105 and/or 111 may include a phased array antenna, a single element antenna, a set of switched beam antennas, and/or the like. In some embodiments, antennas 107, 109, 105 and/or 111 may implement transmit and receive functionalities using separate transmit and receive antenna elements. In some embodiments, antennas 107, 109, 105 and/or 111 may implement transmit and receive functionalities using common and/or integrated transmit/receive elements.

In some demonstrative embodiments, wireless communication units 110, 120, 130 and/or 140 may include, for example, one or more radios, e.g., a radio 114, a radio 124, a radio 134 and/or a radio 144. For example, radios 114, 124, 134 and/or 144 may include one or more wireless transmitters, receivers and/or transceivers able to send and/or receive wireless communication signals, RF signals, frames, blocks, transmission streams, packets, messages, data items, and/or data. For example, wireless communication units 110, 120, 130 and/or 140 may include or may be implemented as part of a wireless Network Interface Card (NIC), and the like.

In some demonstrative embodiments, radios 114, 124, 134 and/or 144 may include one or more radio elements configured to process and communicate one or more RF signals. For example, radio 114 may include Rx elements 116 and/or Tx elements 118.

In some demonstrative embodiments, Rx elements 116 may be configured to receive and/or process one or more RF signals received via antenna 107. For example, Rx elements 116 may include an Rx path 117, a front-end, RF circuits, a baseband, one or more analog to digital converters (A2D), and/or the like.

In some demonstrative embodiments, Tx elements 118 may be configured to process and/or transmit one or more RF signals via antenna 107. For example, Tx elements 118 may include a Tx path 119, one or more digital to analog converters (D2A), a baseband, one or more power amplifiers, RF circuits, a front-end, and/or the like.

In some demonstrative embodiments, one or more elements of Rx elements 116 and/or Tx elements 118 may include or may be included as part of an analog circuit of radios 114, 124, 134 and/or 144. For example, one or more elements of Rx elements 116 and/or Tx elements 118 may be embedded in the analog circuit during manufacturing of radios 114, 124, 134 and/or 144.

In some demonstrative embodiments, system 100 may include two or more stations (STAs). For example, system 100 may include a first station, e.g., device 102, a second station, e.g., device 104, a third station, e.g., device 106, and/or a fourth STA, e.g., device 108.

In some demonstrative embodiments, system 100 may include one or more client STAs, and one or more APs. For example, device 102 may perform the functionality of a client STA and devices 104, 106 and 108 may perform the functionality of an AP, e.g., a WiFi AP, a router, and the like.

In some demonstrative embodiments, system 100 may include one or more mobile devices and/or one or more stationary devices.

In some demonstrative embodiments, device 102 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, an MID, an "Origami" device or computing device, a device that supports DCC, a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments, devices 104, 106 and/or 108 may include a stationary device, e.g., a non-mobile device, for example, an AP, a static router, and the like.

In some demonstrative embodiments, device 102 may utilize a Time of Flight (ToF) measurement, e.g., to determine an estimated location of device 102, for example, when device 102 is located in an indoor location.

A ToF value may be defined as the overall time a signal propagates from a first station, e.g., device 102, to a second station, e.g., device 104, and back to the first station. A distance between the first and second stations may be determined based on the ToF value, for example, by dividing the ToF value by two and multiplying the result by the speed of light, e.g., as described below with reference to FIG. 2.

Device 102 may determine a relative location of device 102 with respect to device 104, e.g., the distance between device 102 and device 104, based on the ToF measurement. Device 102 may determine an estimated location of device 102, by calculating additional distances, e.g., three or more distances, between device 102 and two or more other stations, e.g., device 106 and/or other APs, e.g., as described below with reference to FIG. 3.

In some demonstrative embodiments, the ToF measurement may be performed according to a ToF protocol, e.g., as described below.

Figure 2:
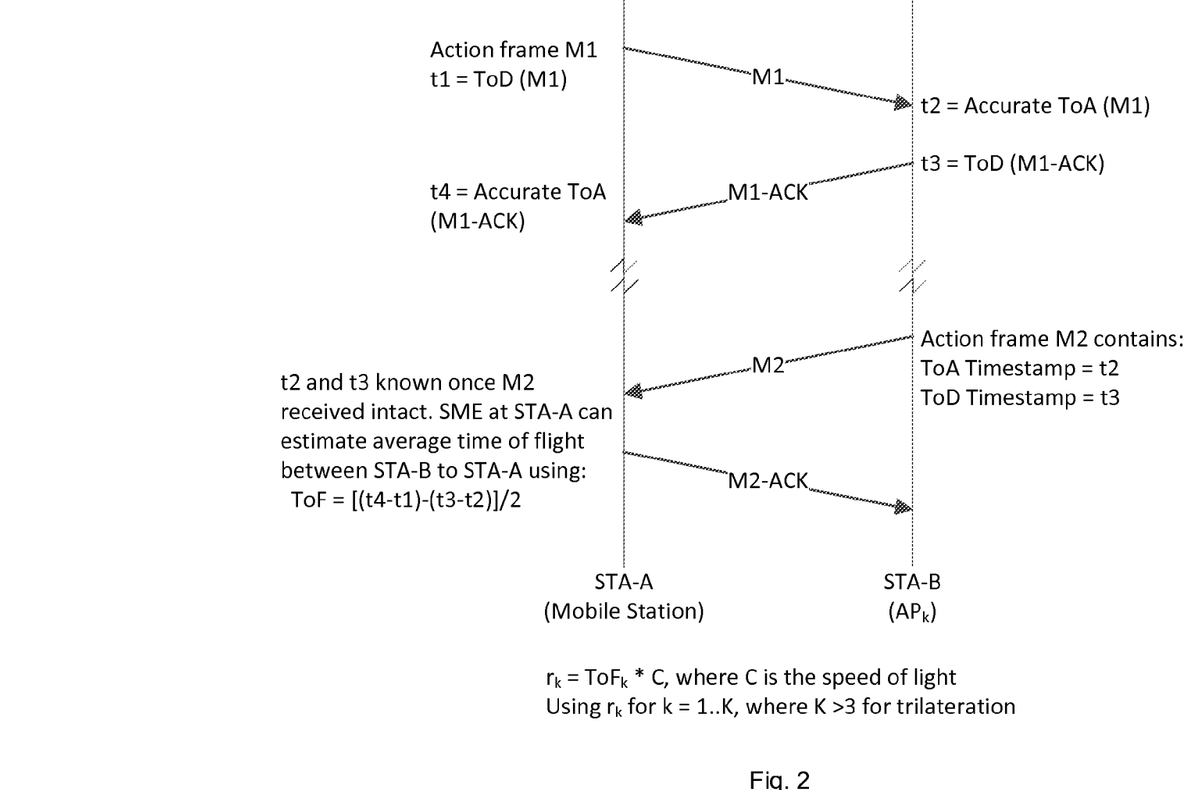
FIG. 2 is a schematic illustration of a sequence diagram, which demonstrates operations and interactions of a Time of Flight (ToF) measurement between a first device and a second device, in accordance with some demonstrative embodiments.

Reference is made to FIG. 2, which schematically illustrates a sequence diagram, which demonstrates operations and interactions of a ToF measurement 200 between a first device (STA A) and a second device (STA B) according a ToF protocol, in accordance with some demonstrative embodiments. In one example, the first device may include a mobile client station, e.g., device 102 (FIG. 1), and the second device may include an AP, e.g., device 104 (FIG. 1), device 106 (FIG. 1) and/or device 108 (FIG. 1).

In some demonstrative embodiments, one or more of the operations of the sequence of FIG. 2 may be performed by the first and second devices, for example, in order to determine at least one location-related parameter, e.g., a relative location ("range") of the first device with respect to the second device and/or to calibrate a radio delay of the first and/or second devices, e.g., as described below.

In some demonstrative embodiments, the first device may transmit a message, denoted M1, to the second device, at a time, denoted t1, e.g., in an unassociated manner. The time t1 may be a Time of Departure (ToD), denoted ToD(M1), of the message M1.

In some demonstrative embodiments, the second device may receive the message M1 and determine a time, denoted t2, e.g., by determining a Time of Arrival (ToA), denoted ToA(M1), of the message M1.

In some demonstrative embodiments, the second device may transmit a message, denoted M1-ACK, to the first device, at a time, denoted t3. The message M1-ACK may include, for example, an acknowledgement message transmitted in response to the message M1. The time t3 may be a ToD, denoted ToD(M1-ACK), of the message M1-ACK.

In some demonstrative embodiments, the first device may receive the message M1-ACK and determine a time, denoted t4, e.g., by determining a ToA, denoted ToA(M1-ACK), of the message M1-ACK.

In some demonstrative embodiments, the second device may transmit a message, denoted M2, to the first device. Message M2 may include, for example, information corresponding to the time t2 and/or the time t3. For example, message M2 may include a timestamp, e.g., a ToA timestamp, including the time t2, and a timestamp, e.g., a ToD timestamp, including the time t3.

In some demonstrative embodiments, the first device may receive message M2. The first device may determine a ToF between the first and second devices, for example, based on message M2.

In other embodiments, the first device may transmit the Message M2 to the second device. Message M2 may include, for example, information corresponding to the time t1 and/or the time t4. For example, message M2 may include a timestamp, e.g., a ToD timestamp, including the time t1, and a timestamp, e.g., a ToA timestamp, including the time t4. The second device may determine a ToF between the first and second devices, for example, based on the message M2.

For example, the first device may determine an average ToF based on a calculation to applied to the time values t1, t2, t3 and t4. For example, the first device may determine the ToF, e.g., as follows:

$$\text{ToF}=[(t4-t1)-(t3-t2)]/2 \qquad (1)$$

In some demonstrative embodiments, the first device may transmit a message, denoted M2-ACK, to the second device. Message M2-ACK may include, for example, an acknowledgement message transmitted in response to message M2.

In some demonstrative embodiments, the first device may determine the range between the first and second devices based on the determined ToF.

For example, the first device may determine the range, denoted $r_k$, e.g., as follows:

$$r_k = \text{ToF}*C \qquad (2)$$

wherein C denotes the radio wave propagation speed, e.g., the speed of light.

In some demonstrative embodiments, the first device may determine a location of the first device, e.g., an absolute location of the first device, based on the estimated range $r_k$, e.g., as described below.

For example, the first device may determine two or more ToF values and/or range values, e.g., according to Equations 1 and/or 2, with respect to two or more respective other devices, e.g., at least three or four other devices, and may determine the location of the first device based on the two or more ToF values, for example, by trilateration, e.g., as described below with reference to FIG. 3.

Figure 3:
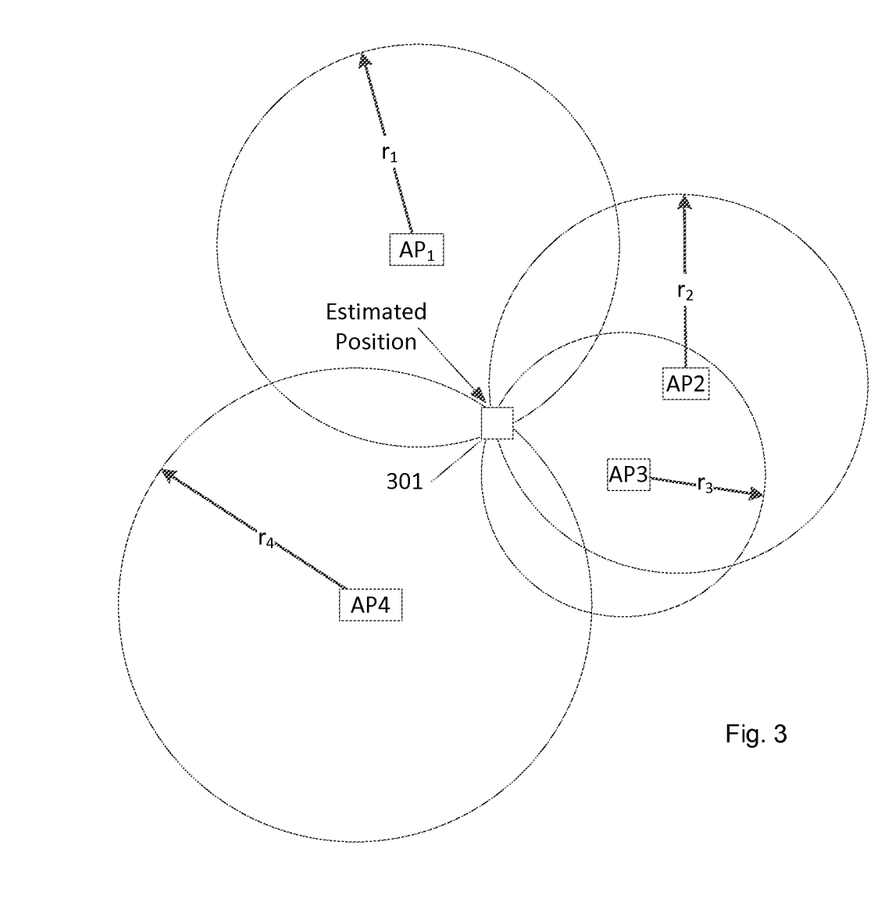
FIG. 3 is a schematic illustration of an estimated position calculation of a device, in accordance with some demonstrative embodiments.

Reference is made to FIG. 3, which schematically illustrates an estimated position calculation of a device 301, in accordance with some demonstrative embodiments. In some demonstrative embodiments, device 301 may perform the functionality of the first device (STA A in FIG. 2).

In some demonstrative embodiments, device 301 may calculate the ToF between device 301 and two or more other devices, e.g., four devices, denoted $AP_1$, $AP_2$, $AP_3$ and $AP_4$. For example, devices $AP_1$, $AP_2$, $AP_3$ and/or $AP_4$ may perform the functionality of the second device (STA B in FIG. 2).

As shown in FIG. 3, device 301 may determine ranges, denoted $r_1$, $r_2$, $r_3$ and $r_4$, to devices $AP_1$, $AP_2$, $AP_3$ and $AP_4$, respectively, e.g., by calculating the ToF to each one of the devices $AP_1$, $AP_2$, $AP_3$ and $AP_4$, as described above.

As shown in FIG. 3, device 301 may calculate an estimated location of device 301 by utilizing any suitable method using the determined ranges $r_1$, $r_2$, $r_3$ and $r_4$. For example, device 301 may calculate the estimated location using trilateration.

Referring back to FIG. 1, in some demonstrative embodiments radio 114, radio 124, radio 134 and/or radio 144 may introduce one or more radio delays into signals communicated by devices 102, 104, 106 and/or 108.

In some demonstrative embodiments, a radio delay of a radio may include a radio delay introduced by the Tx elements and/or the Rx elements of the radio.

In some demonstrative embodiments, radio 114 may introduce a radio delay into a signal received by radio 114. For example, the radio delay may be introduced by Rx elements 116, e.g., a delay introduced by Rx path 117, the baseband, the one or more A2D converters and/or the like.

In some demonstrative embodiments, radio 114 may introduce a radio delay into a signal transmitted by radio 114. For example, the radio delay may be introduced by Tx elements 118, e.g., a delay introduced by Tx path 119, the baseband, the one or more D2A converters, the front-end and/or the like.

For example, time t1 (FIG. 2) may include a radio delay introduced by radio 114, for example, a Tx delay introduced by Tx elements 118, e.g., an RF path delay introduced by Tx path 119, when device 102 transmits message M1 (FIG. 2); time t2 (FIG. 2) may include a radio delay introduced by radio 124, e.g., an Rx delay of radio 124, when device 104 receives message M1 (FIG. 2); time t3 may include a radio delay introduced by radio 124, e.g., a Tx delay of radio 124, when device 104 transmits message M1-ACK (FIG. 2); and time t4 may include a radio delay introduced by Radio 114, for example, an Rx delay introduced by Rx elements 116, e.g., an RF path delay introduced by Rx path 117, when device 102 receives message M1-ACK (FIG. 2).

The ToF measurement, which may be based on the timing of the communicated signals, may include the radio delays and, as a result, a location calculated based on the ToF measurement may have reduced accuracy. For example, a delay of more than 10 nanoseconds (ns) may account for a deviation of at least 3 meters from an actual location.

For example, an estimated range, denoted $R_{biased}$, e.g., range $r_k$ (FIG. 2), between the first and second stations (FIG. 2), may be represented as a sum of an accurate range, denoted $r_{ideal}$, between the first and second stations (FIG. 2), and a range error, denoted $r_{error}$, resulting from the radio delay, e.g., as follows:

$$R_{biased} = r_{ideal} + r_{error} \qquad (3)$$

In some demonstrative embodiments, radios 114, 124, 134 and/or 144 may have different radio delay values. For example, the radio delay of radio 114 may be different from the radio delay of radio 124. Accordingly, a different range error value may be introduces by different radios, e.g., different values of $r_{error}$ for different devices.

The radio delay of the radio may result, for example, from process variation, e.g., when manufacturing the analog circuit of the radio, environmental temperature, aging of the analog circuit and/or hardware configuration of the analog circuit, e.g., different chipset, same chipset with different front end and/or different antennas, and the like.

The radio delay may vary between a few nanoseconds and a few hundreds of nanoseconds. As a result, a location error of a wireless communication device may vary between a few centimeters and a few meters or more.

A device may be required to know the radio delay of the device in order to determine an accurate ToF value and/or an accurate location of the device. For example, device 102 may be required to know the radio delay of radio 114 to determine an accurate ToF value between devices 102 and 104, and/or to determine an accurate location of device 102.

It may be impossible to know the radio delay introduced by the device, e.g., without performing a calibration procedure to determine the radio delay of the device.

A calibration procedure may be performed during manufacturing of the device, e.g., manufacturing of the radio, to calibrate the radio delay of the device. However, this calibration procedure may be relatively complex, may consume a relatively great amount of time and/or may be relatively expensive.

In some demonstrative embodiments, a device of system 100, e.g., a device of devices 102, 104, 106 and/or 108, may be configured to calibrate the radio delay of at least one radio during operation of the device, for example, after manufacturing of the device, e.g., as described below.

In some demonstrative embodiments, device 102 may include a radio delay calibrator 112 configured to calibrate at least one radio delay of wireless communication device 102. For example, radio delay calibrator 112 may be configured to calibrate the radio delay of radio 114 during operation of device 102, e.g., as described below.

In some demonstrative embodiments, radio delay calibrator 112 may calibrate the radio delay of radio 114 based on one or more calibration messages received by device 102 from one or more of devices 104, 106 and/or 108.

In some demonstrative embodiments, the calibration messages received by device 102 may include calibration information, which is based on radio delays of devices 104, 106 and/or 108. For example, the calibration messages may include calibration information based on the radio delay of radio 124, the radio delay of radio 134 and/or the radio delay of radio 144, e.g., as described below.

In some demonstrative embodiments, radio delay calibrator 112 may calibrate the radio delay of radio 114 based on one or ToF measurements performed with devices 104, 106 and/or 108 and utilizing the radio delays of devices 104, 106 and/or 108, e.g., as described in detail below.

In some demonstrative embodiments, devices 104, 106 and/or 108 may include a calibrated device. For example, device 104 may be a calibrated device, e.g., a radio delay of radio 124 may be known to device 104, while devices 106 and 108 may not be calibrated.

In some demonstrative embodiments, radio delay calibrator 112 may be configured to calibrate the radio delay of radio 114 utilizing the calibrated device. For example, radio delay calibrator 112 may utilize calibrated device 104 to calibrate the radio delay of radio 114, e.g., when locations of device 102 and device 104 are known.

In some demonstrative embodiments, radio delay calibrator 112 may calibrate the radio delay of radio 114 based on a ToF measurement, e.g., ToF measurement 200 (FIG. 2), between device 102 and the calibrated device. For example, radio delay calibrator 112 may calibrate the radio delay of radio 114 based on ToF measurement 200 (FIG. 2) between devices 102 and 104, e.g., as described below.

In some demonstrative embodiments, devices 104, 106 and/or 108 may not include a calibrated device. For example, wireless communication device 104, 106 and/or 108 may not be calibrated.

In some demonstrative embodiments, radio delay calibrator 112 may be configured to calibrate the radio delay of radio 114 by utilizing at least first and second non-calibrated other devices. For example, radio delay calibrator 112 may utilize the first and the second non-calibrated devices to calibrate the radio delay of radio 114, when a location of device 102, a location of the first other device and a location of the second other device are known.

In some demonstrative embodiments, radio delay calibrator 112 may calibrate the radio delay of radio 114 based on a first ToF measurement, e.g., ToF measurement 200 (FIG. 2), between device 102 and the first other device, a second ToF measurement, e.g., ToF measurement 200 (FIG. 2), between device 102 and the second other device, and a third ToF measurement, e.g., ToF measurement 200 (FIG. 2), between the first other device and the second other device. For example, radio delay calibrator 112 may calibrate the radio delay of radio 114 based on a first ToF measurement 200 (FIG. 2) between device 102 and device 104, a second ToF measurement 200 (FIG. 2) between device 102 and device 106, and a third ToF measurement 200 (FIG. 2) between device 104 and device 106, e.g., as described below with reference to FIG. 4.

In some demonstrative embodiments, radio delay calibrator 112 may be configured to calibrate the radio delay of radio 114 utilizing at least three other non-calibrated devices. For example, radio delay calibrator 112 may utilize the at least three other non-calibrated devices to calibrate the radio delay of radio 114, e.g., when a location of one of the at least three other non-calibrated devices is unknown and the locations of device 102 and two of the at least three other non-calibrated devices are known. For example, the locations of devices 102, 104 and 106 may be known, while the location of device 108 may be unknown.

In some demonstrative embodiments, radio delay calibrator 112 may calibrate the radio delay of radio 114 based on at least three ToF measurements between device 102 and the at least three other devices, and based on a plurality of ToF measurements between a plurality of different pairs of the at least three other devices. For example, radio delay calibrator 112 may calibrate the radio delay of radio 114 based on three ToF measurements between device 102 and devices 104, 106 and 108, respectively, and based on a plurality of ToF measurements between a plurality of different pairs of devices 104, 106 and 108, e.g., a ToF measurement between devices 104 and 106, a ToF measurement between devices 108 and 106, and/or other ToF measurements between any other pairs of devices 104, 106 and/or 108, e.g., as described below with reference to FIG. 4.

In some demonstrative embodiments, radio delay calibrator 112 may be configured to calibrate the radio delay of radio 114 utilizing four or more other devices. For example, radio delay calibrator 112 may utilize the four or more other devices, e.g., if the locations of one or more of the other devices are unknown. For example, for every device having an unknown location, radio delay calibrator 112 may utilize one more other devices.

In some demonstrative embodiments, the one or more calibration messages communicated by device 102 may include an is-calibrated message, e.g., as described below.

In some demonstrative embodiments, the is-calibrated message communicated by device 102 may include an is-calibrated query message transmitted from wireless communication unit 110 to a particular device of devices 104, 106 and/or 108.

In some demonstrative embodiments, the is-calibrated message communicated by device 102 may include an is-calibrated response message transmitted, in response to the is-calibrated request message, from the particular device of devices 104, 106 and/or 108 to wireless communication unit 110.

In some demonstrative embodiments, the is-calibrated response message may include a degree of calibration of the particular device of devices 104, 106 and/or 108.

For example, the is-calibrated response message may indicate whether or not one or more delay parameters of at least one radio of radios 124, 134 and 144 are calibrated.

In some demonstrative embodiments, the delay parameters may include one or parameters of the radio delay, e.g., Tx delay parameters and/or Rx delay parameters.

In one example, device 102 may transmit to device 104 an is-calibrated query message. Device 104 may transmit the is-calibrated response to device 102, in response to the is-calibrated query message, indicating that radio 124 is not calibrated.

In another example, the is-calibrated response message transmitted by device 104 may include an indication whether or not one or more delay parameters of radio 124 of device 104 are calibrated.

For example, device 102 may transmit to device 104 an is-calibrated request message. Device 104 may transmit to device 102, in response to the is-calibrated request message, an is-calibrated response frame including one or more delay parameters of radio 124, for example, a calibration quality of radio 124, a date of a last calibration of radio 124, a calibration type of radio 124, and the like.

In some demonstrative embodiments, the one or more calibration messages communicated by device 102 may include a ToF calibration message received from a particular device of devices 104, 106 and/or 108, e.g., as described below.

In some demonstrative embodiments, the ToF calibration message may include timing information of a ToF measurement performed by the particular device, e.g., as described below.

In some demonstrative embodiments, the ToF calibration message communicated by device 102 may include one or more calibration-measurement messages including timing information of a ToF measurement, e.g., ToF measurement 200 (FIG. 2), between one or more pairs of devices 104, 106 and/or 108. In one example, the calibration measurement messages may include timing information of ToF measurement 200 (FIG. 2) between devices 104 and 106. In another example, the calibration measurement messages may include timing information of ToF measurement 200 (FIG. 2) between devices 104 and 108. In yet another example, the calibration measurement messages may include timing information of ToF measurement 200 (FIG. 2) between devices 106 and 108.

In some demonstrative embodiments, the ToF calibration messages communicated by device 102 may include a ToF calibration request message transmitted from wireless communication unit 110 to a first other wireless communication device indicating at least a second other wireless communication device.

In some demonstrative embodiments, the ToF calibration message communicated by device 102 may include a ToF calibration response message transmitted from the first other device to wireless communication unit 110, in response to the ToF calibration request message. The ToF calibration message may include timing information of a ToF measurement, e.g., ToF measurement 200 (FIG. 2), performed with the second other device.

In one example, wireless communication unit 110 may transmit to device 104 a ToF calibration request message including an indication of device 106. Device 104 may transmit to device 102 a ToF calibration response message, in response to the ToF calibration request message, including timing information of ToF measurement 200 (FIG. 2) performed between device 104 and device 106.

In another example, wireless communication unit 110 may transmit to device 106 a ToF calibration request message including an indication of device 108. Device 106 may transmit to device 102 a ToF calibration response message, in response to the ToF calibration request message, including timing information of ToF measurement 200 (FIG. 2) performed between device 106 and device 108.

In some demonstrative embodiments, radio delay calibrator 112 may utilize the is-calibrated messages to calibrate the radio delay of radio 114, e.g., as described below.

In some demonstrative embodiments, device 102 may calibrate the radio delay of radio 114 utilizing a calibrated device, e.g., when a location of device 102 and a location of the calibrated device are known, e.g., as described below.

In some demonstrative embodiments, device 102 may transmit an is-calibrated query message to one or more devices of devices 104, 106 and/or 108.

In some demonstrative embodiments, device 102 may receive one or more is-calibrated responses, in response to the is-calibrated message query, from one or more devices of devices 104, 106 and/or 108.

In some demonstrative embodiments, radio delay calibrator 112 may select a device to calibrate the radio delay of radio 114 based on the is-calibrated responses.

In one example, device 102 may receive an is-calibrated response from device 104 indicating that radio 124 is calibrated, and device 102 may receive is-calibrated responses from device 106 and 108 indicating that radios 134 and 146 are not calibrated. Accordingly, radio delay calibrator 112 may select device 104 to calibrate the radio delay of radio 114.

In another example, device 102 may receive an is-calibrated response from device 104 including an indication of a first degree of calibration of radio 124, e.g., a first calibration quality, an is-calibrated response from device 106 including an indication of a second degree of calibration of radio 134, e.g., a second calibration quality, and an is-calibrated response from device 108 indicating that radio 144 is not calibrated. Accordingly, radio delay calibrator 112 may select device 104 to calibrate the radio delay of radio 114, e.g., if the first degree of calibration is greater than the second degree of calibration, for example, if the first calibration quality of radio 124 is greater than the second calibration quality of radio 134. Radio delay calibrator 112 may select device 106 to calibrate the radio delay of radio 114, e.g., if the second degree of calibration is greater than the first degree of calibration, for example, if the second calibration quality of radio 134 is greater than the first calibration quality of radio 124.

In another example, device 102 may receive is-calibrated responses from devices 104, 106 and 108 indicating that radios 124, 134 and 144 are not calibrated. Accordingly, radio delay calibrator 112 may not calibrate the radio delay of radio 114 utilizing a calibrated device. In such an example, radio delay calibrator 112 may utilize a plurality of ToF measurement between one or more pairs of devices 102, 104, 106 and/or 108, e.g., as described below with reference to FIG. 4.

In some demonstrative embodiments, radio delay calibrator 112 may calibrate the radio delay of radio 114 by performing ToF measurement 200 (FIG. 2) with the selected calibrated device, e.g., device 104.

In some demonstrative embodiments, the selected calibrated device may provide to radio delay calibrator 112 one or more calibration parameters, e.g., a value of the radio delay of the calibrated device. For example, device 104 may provide to radio delay calibrator 112 the radio delay of radio 124, e.g., as device 104 knows the radio delay of radio 124, for example, from a calibration during manufacturing and/or from a calibration as described herein.

In some demonstrative embodiments, radio delay calibrator 112 may determine the range $R_{biased}$ between devices 102 and 104 based on the ToF measurement between devices 102 and 104, e.g., according to equation 3.

In some demonstrative embodiments, the accurate range $R_{ideal}$ may be determined based on an accurate distance between devices 102 and 104, e.g., if locations of devices 102 and 104 are known, and/or if the accurate distance between devices 102 and 104 is already known, for example, if devices 102 and 104 are brought in close proximity to each other, e.g., in contact with one another, such that the accurate distance may be zero. For example, radio delay calibrator 112 may determine the accurate range $R_{ideal}$ based on a reference map, in which the locations of devices 102 and 104 are marked.

In some demonstrative embodiments, the range error $R_{error}$ may be represented by a sum of a first range error, denoted $R_{error1}$, introduced by the radio delay of radio 114, and a second range error, denoted $R_{error2}$, introduced by the radio delay of radio 124, e.g., as follows:

$$R_{error} = R_{error1} + R_{error2} \tag{4}$$

In some demonstrative embodiments, radio delay calibrator 112 may receive from device 104 the radio delay of radio 124, which is known by device 104.

In some demonstrative embodiments, radio delay calibrator 112 may determine the second range error $R_{error2}$ by multiplying the radio delay of radio 124 by the speed of light.

In some demonstrative embodiments, radio delay calibrator 112 may determine the first range error $R_{error1}$, based on Equations 3 and 4.

In some demonstrative embodiments, radio delay calibrator 112 may determine the radio delay of radio 114, for example, by dividing the calculated first range error $R_{error1}$ by the speed of light.

In some demonstrative embodiments, radio delay calibrator 112 may be configured to calibrate the radio delay of radio 114 by utilizing first and second non-calibrated other devices, e.g., when a location of device 102, a location of the first device and/or a location of the second device are known. For example, radio delay calibrator 112 may calibrate the radio delay of radio 114 by utilizing devices 106 and 108, which may not be calibrated and the locations of devices 102, 106 and 108 are known.

In some demonstrative embodiments, radio delay calibrator 112 may calibrate the radio delay of radio 114 based on a first ToF measurement between device 102 and device 106, a second ToF measurement between device 102 and device 108, and a third ToF measurement between device 106 and device 108, e.g., as described below with reference to FIG. 4.

Figure 4:
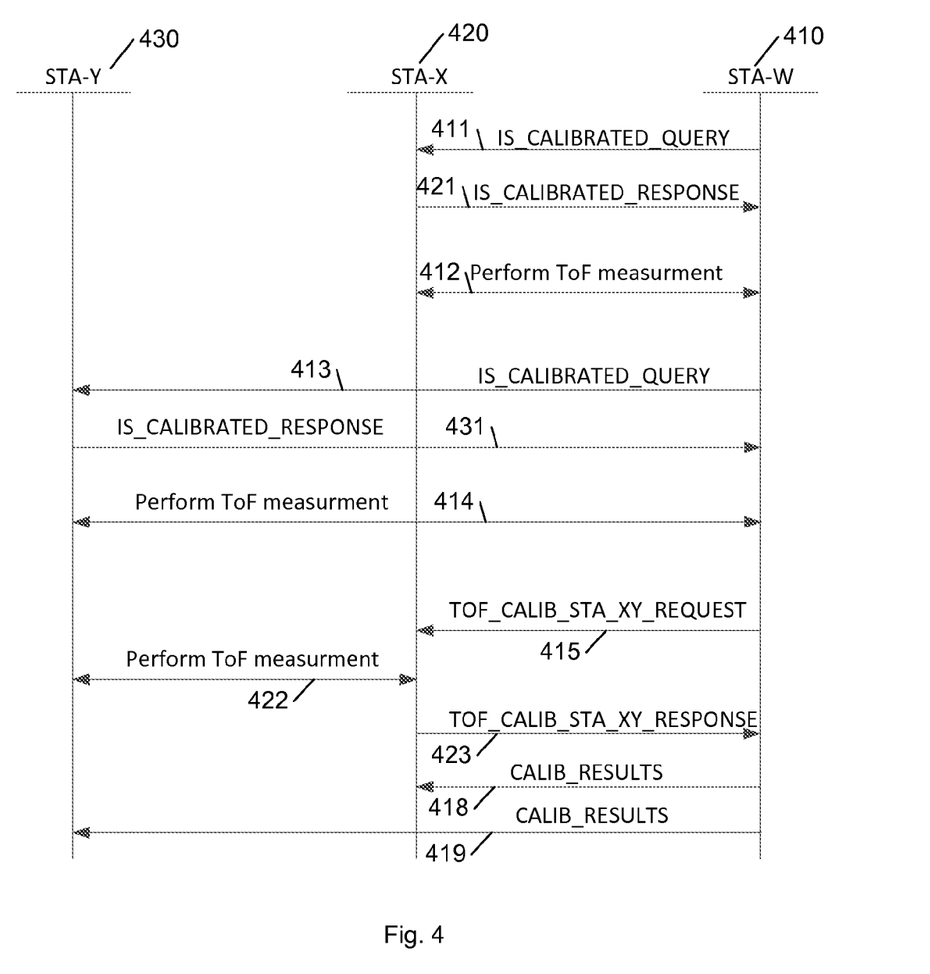
FIG. 4 is a schematic illustration of a sequence diagram, which demonstrates operations and interactions of group calibration between a group of devices, in accordance with some demonstrative embodiments.

Reference is made to FIG. 4, which schematically illustrates a sequence diagram, which demonstrates operations and interactions of a radio delay calibration sequence 400 between a wireless communication device 410 (STA-W) and two other wireless communication devices, e.g., a first device 420 (STA-X) and a second device 430 (STA-Y), in accordance with some demonstrative embodiments. For example, device 410 may perform the functionality of device 102 (FIG. 1), and/or devices 420 and 430 may perform the functionality of two of devices 104, 106 and/or 108 (FIG. 1).

In some demonstrative embodiments, the locations of devices 410, 420 and/or 430 may be known. For example, devices 410, 420 and/or 430 may include stationary devices, e.g., a static AP and/or a router, and/or a mobile device placed a know location and/or distance from the other devices.

As shown in FIG. 4, device 410 may initiate path delay calibration sequence 400 by sending an is-calibrated query message 411 to device 420.

As shown in FIG. 4, device 420 may transmit to device 410, in response to is-calibrated query message 411, an is-calibrated response message 421, e.g., indicating that device 420 is not calibrated.

As shown in FIG. 4, device 410 may perform a ToF measurement 412, e.g., ToF measurement 200 (FIG. 2), with device 420.

As shown in FIG. 4, device 410 may send an is-calibrated query message 413 to device 430.

As shown in FIG. 4, device 430 may transmit to device 410, in response to is-calibrated query message 413, an is-calibrated response message 431, e.g., indicating that device 430 is not calibrated.

As shown in FIG. 4, device 410 may perform a ToF measurement 414, e.g., ToF measurement 200 (FIG. 2), with device 430.

As shown in FIG. 4, device 410 may send to device 420 a ToF calibration request message 415 indicating device 430, e.g., requesting device 420 to provide results of a ToF measurement with device 430.

As shown in FIG. 4, device 420 may perform a ToF measurement 422, e.g., ToF measurement 200 (FIG. 2), with device 430, e.g., in response to ToF calibration request message 415.

As shown in FIG. 4, device 420 may transmit to device 410 a ToF calibration response message 423 including timing information of ToF measurement 422, e.g., in response to ToF calibration request message 415.

In some demonstrative embodiments, device 410 may include a radio delay calibrator, e.g., radio delay calibrator 112 (FIG. 1), to calibrate a radio delay of device 410 based on path delay calibration sequence 400, e.g., as described below.

In some demonstrative embodiments, a biased range, denoted $R_{biasedW,X}$, between device 410 (STA-W) and device 420 (STA-X), may be determined from a ToF measurement, for example, ToF measurement 412, between devices 410 and 420. The biased range $R_{biasedW,X}$ may be determined, e.g., as follows:

$$R_{biasedW,X}=((T_w+B_w)-(T_x+B_x))\cdot C \quad (5)$$

wherein $T_w$ denotes timing information of device 410, e.g., time t1 (FIG. 2), $B_w$ denotes a radio delay introduced by a radio of device 410, $T_x$ denotes timing information of device 420, e.g., time t2 (FIG. 2), $B_x$ denotes a radio delay introduced by a radio of device 420, and C denotes the speed of light.

In some demonstrative embodiments, a biased range, denoted $R_{biasedW,Y}$, between device 410 and device 430 (STA-Y), may be determined from a ToF measurement, for example, ToF measurement 414, between devices 410 and 430. The biased range $R_{biasedW,Y}$ may be determined, e.g., as follows:

$$R_{biasedW,Y}=((T_w+B_w)-(T_y+B_y))\cdot C \quad (6)$$

wherein, $T_y$ denotes timing information of device 420, e.g., time t2 (FIG. 2), and $B_y$ denotes a radio delay introduced by a radio of device 430.

In some demonstrative embodiments, a biased range, denoted $R_{biasedY,X}$, between device 430 and device 420, may be determined from a ToF measurement, for example, ToF measurement 422, between devices 420 and 430. The biased range $R_{biasedY,X}$ may be determined, e.g., as follows:

$$R_{biasedY,X}=((T_y+B_y)-(T_x+B_x))\cdot C \quad (7)$$

In some demonstrative embodiments, radio delay calibrator 112 (FIG. 1) may determine radio delay values of devices 410, 420 and 430, e.g., $B_w$, $B_x$ and $B_y$, for example, by solving Equations 5, 6 and 7.

Alternatively, radio delay calibrator 112 (FIG. 1) may determine the radio delay values $B_w$, $B_x$ and $B_y$ for example, by solving the following set of Equations:

$$R_{errorW,X}/C=B_w\text{-}B_x$$

$$R_{errorW,Y}/C=B_w\text{-}B_y$$

$$R_{errorY,X}/C=B_y\text{-}B_x \quad (8)$$

wherein $R_{errorW,X}$ denotes a range error resulting from the radio delay introduced by devices 410 (STA-W) and 420 (STA-X), $R_{errorW,Y}$ denotes a range error resulting from the radio delay introduced by devices 410 and 430 (STA-Y), and $R_{errorY,X}$ denotes a range error resulting from the radio delay introduced by devices 420 and 430.

In some demonstrative embodiments, the range error may be determined from Equation 3, e.g., using the known ranges, $R_{ideal}$ and $R_{biased}$. For example, the range $R_{ideal}$ may be determined based on the accurate ranges between devices 410, 420 and 430, which may be known, and the range $R_{biased}$ may be determined by ToF measurements between devices 410, 420 and 430, e.g., as described above.

In some demonstrative embodiments, radio delay calibrator 112 (FIG. 1) may utilize at least three other devices, e.g., device 420, device 430 and a third device, for example, when a location of one of the at least three devices is unknown. For example, the location of device 420 may be unknown.

In some demonstrative embodiments, radio delay calibrator 112 (FIG. 1) may determine the radio delay of device 410 based on at least three ToF measurements between device 410 and the at least three other devices, and based on a plurality of ToF measurements between a plurality of different pairs of the at least three other devices. For example, radio delay calibrator 112 (FIG. 1) may calibrate the radio delay of device 410 based on ToF measurements 412 and 414, and ToF measurement 200 (FIG. 2) between device 410 and the third other device; and one or more ToF measurements between pairs of the other devices, for example, ToF measurement 422, and/or ToF measurements between the third other device and devices 420 and/or 430.

In some demonstrative embodiments, radio delay calibrator 112 (FIG. 1) may utilize one or more other devices and/or more additional equations to determine the radio delay of device 410, e.g., if a location of one or more other devices is unknown.

In some demonstrative embodiments, device 410 may transmit to devices 420 and 430 messages, e.g., 418 and 419, including the radio delays of devices 410, 420 and/or 430, e.g., the calculated values $B_w$, $B_x$ and $B_y$.

Referring back to FIG. 1, in some demonstrative embodiments radio delay calibrator 112 may be configured to perform the calibration of the radio delay of radio 114 automatically. For example, radio delay calibrator 112 may initiate calibrating the radio delay, when device 102 is operated for the first time, e.g., if there are one or more other wireless communication devices that may enable the calibration.

In some demonstrative embodiments, a user of device 102 may cause radio delay calibrator 112 to perform the calibration of the radio delay of radio 114. For example, the user may initiate the calibration, for example, upon installing an AP or a router, when device 102 is at a designated location, which has a setup for performing the calibration, e.g., as described herein.

In some demonstrative embodiments, radio delay calibrator 112 may be configured perform the calibration periodically, for example, to monitor relatively small changes in the radio delay of radio 114, e.g., due to ageing of device 102 and/or the analog circuits of radio 114.

In some demonstrative embodiments, the calibration process described herein may be useful, for example, when calibrating a relatively large number of devices, e.g., routers and/or APs. For example, when installing a large amount of devices, which are non-calibrated, e.g., new "out of the box" devices.

In some demonstrative embodiments, device 102 may utilize the radio delays of devices 102, 104, 106 and/or 108, e.g., when performing ToF measurement 200 (FIG. 2) between device 102 and one or more of devices 104, 106 and/or 108.

As a result, ToF performance and/or robustness of devices 102, 104 and/or 106 may increase.

In some demonstrative embodiments, an increase in the accuracy of the calculated ToF may result in an increase in the accuracy of a calculated location of device 102. For example, the accuracy of ranges $r_1$, $r_2$, $r_3$ and $r_4$ (FIG. 3) may increase and, accordingly, the estimated location of device 301 (FIG. 3) may be more accurate.

Figure 5:
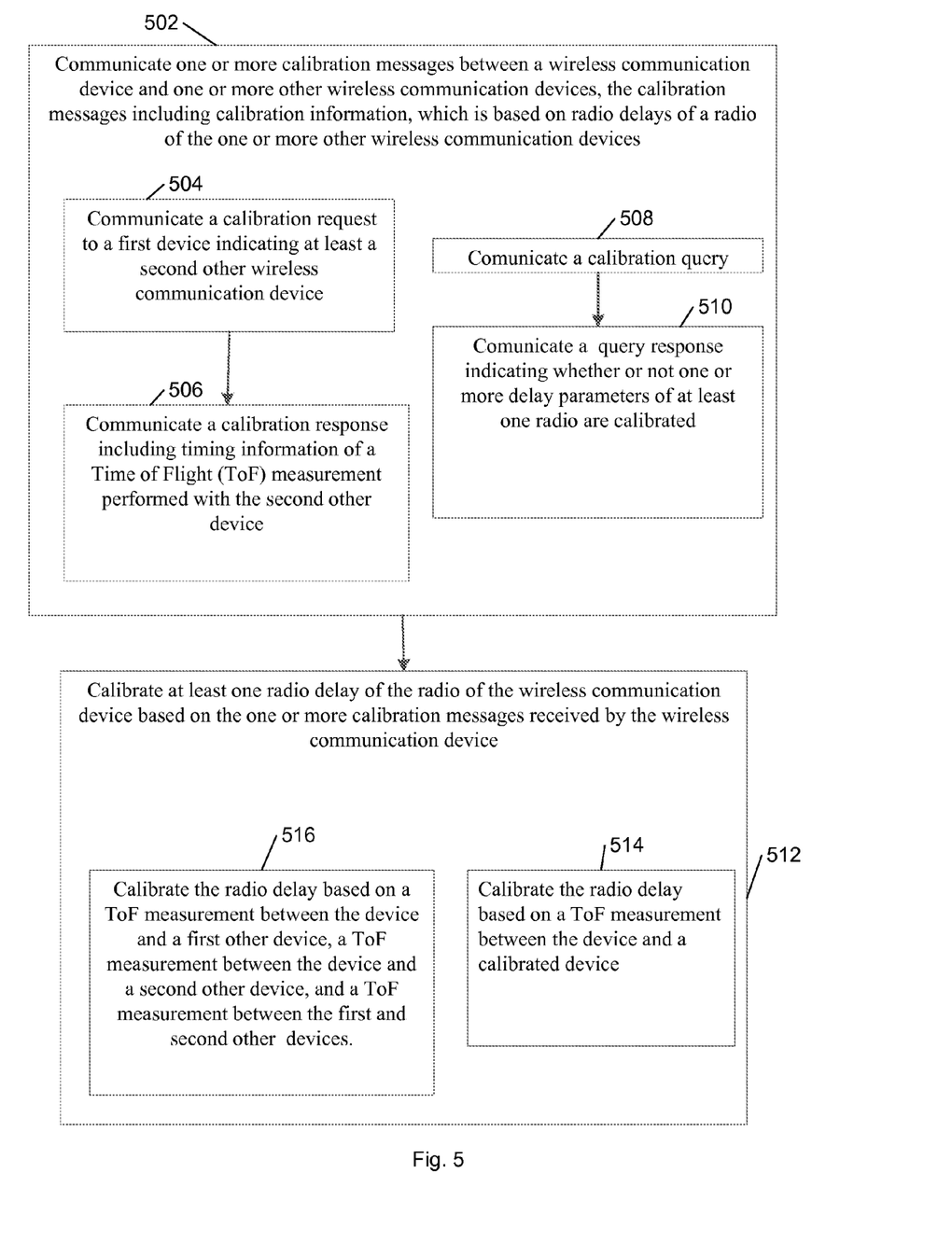
FIG. 5 is a schematic flow-chart illustration of a method of calibrating a radio delay, in accordance with some demonstrative embodiments.

Reference is made to FIG. 5, which schematically illustrates a method of calibrating a radio delay, in accordance with some demonstrative embodiments. In some embodiments, one or more of the operations of the method of FIG. 5 may be performed by a wireless communication system, e.g., system 100 (FIG. 1); a wireless communication device, e.g., devices 102, 104, 106 and/or 108 (FIG. 1); a wireless communication unit, e.g., wireless communication units 110, 120, 130 and/or 140 (FIG. 1), and/or a radio delay calibrator, e.g., radio delay calibrator 112 (FIG. 1).

As indicated at block 502, the method may include communicating one or more calibration messages between a wireless communication device and one or more other wireless communication devices, the calibration messages including calibration information, which is based on radio delays of the one or more other wireless communication devices. For example, device 102 (FIG. 1) may communicate one or more calibration messages between device 102 (FIG. 1) and one or more of wireless communication devices 104, 106 and/or 108, the calibration messages including calibration information, which is based on radio delays of one or more of devices 104, 106 and/or 108 (FIG. 1), e.g., as described above.

As indicated at block 504, communicating the calibration messages may include communicating a ToF calibration request to a first other device indicating at least a second other wireless communication device. For example, device 410 (FIG. 4) may communicate to device 420 (FIG. 4) ToF calibration request 415 (FIG. 4) indicating device 430 (FIG. 4), e.g., as described above.

As indicated at block 506, communicating the calibration messages may include communicating a ToF calibration response including timing information of a ToF measurement performed with the second other device. For example, device 420 (FIG. 4) may transmit to device 410 (FIG. 4) ToF calibration response 423 (FIG. 4) including timing information of ToF measurement 422 (FIG. 4), e.g., as described above.

As indicated at block 508, communicating the calibration messages may include communicating a calibration query. For example, device 410 (FIG. 4) may transmit is-calibrated query message 411 (FIG. 4) to device 420 (FIG. 4), e.g., as described above.

As indicated at block 510, communicating the calibration messages may include communicating a query response indicating whether or not one or more delay parameters of at least one radio are calibrated. For example, device 420 (FIG. 4) may transmit to device 410 (FIG. 4) is-calibrated response message 421 (FIG. 4) indicating that device 420 (FIG. 4) is not calibrated, e.g., as described above.

As indicated at block 512, the method may include calibrating at least one radio delay of the wireless communication device based on the one or more calibration messages received by the wireless communication device. For example, device 102 (FIG. 1) may calibrate the radio delay of radio 114 (FIG. 1) based on the one or more calibration messages received by device 102 (FIG. 1), e.g., as described above.

As indicated at block 514, calibrating the radio delay may include calibrating the radio delay based on a ToF measurement between the device and a calibrated device. For example, device 102 (FIG. 1) may calibrate the radio delay of radio 114 (FIG. 1) based on ToF measurement 200 (FIG. 2) between device 102 (FIG. 1) and device 104 (FIG. 1), for example, if device 104 is calibrated, e.g., as described above.

As indicated at block 516, calibrating the radio delay may include calibrating the radio delay based on a ToF measurement between the device and a first other device, a ToF measurement between the device and a second other device, and a ToF measurement between the first and second other devices. For example, device 102 (FIG. 1) may calibrate the radio delay of radio 114 (FIG. 1) based on ToF measurement 200 (FIG. 2) between device 102 (FIG. 1) and device 106 (FIG. 1), ToF measurement 200 (FIG. 2) between device 102 (FIG. 1) and device 108 (FIG. 1), and ToF measurement 200 (FIG. 2) between device 106 (FIG. 1) and device 108 (FIG. 1), e.g., as described above.

Figure 6:
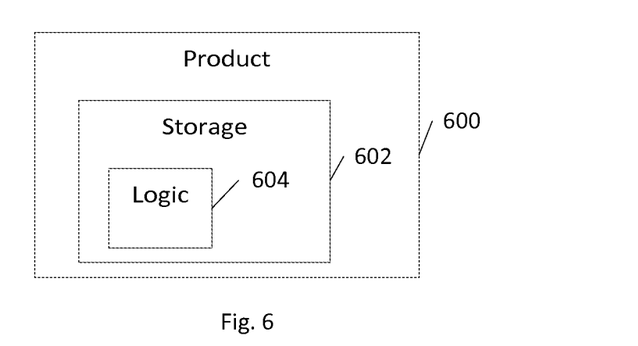
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), device 104 (FIG. 1), device 106 (FIG. 1), device 108 (FIG. 1), wireless communication unit 110 (FIG. 1), wireless communication unit 120 (FIG. 1), wireless communication unit 130 (FIG. 1), wireless communication unit 140 (FIG. 1), and/or radio delay calibrator 112 (FIG. 1) and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising: a radio delay calibrator to calibrate at least one radio delay of a radio of a wireless communication device based on one or more calibration messages received by said wireless communication device from one or more other wireless communication devices, the calibration messages including calibration information, which is based on radio delays of said one or more other wireless communication devices, wherein the one or more calibration messages include one or more calibration-measurement messages including timing information of a Time of Flight (ToF) measurement between one or more pairs of said other wireless communication devices.

2. The apparatus of claim 1, wherein the one or more other wireless communication devices include a calibrated device, and wherein said one or more calibration messages include a message including an indication of a degree of calibration of a radio of said calibrated device.

3. The apparatus of claim 2, wherein said radio delay calibrator is to calibrate said radio delay of said wireless communication device based on a Time of Flight (ToF) measurement between said wireless communication device and said calibrated device.

4. The apparatus of claim 1, wherein said one or more other wireless communication devices include at least first and second other devices, said radio delay calibrator is to calibrate said radio delay of said wireless communication device based on a first ToF measurement between said wireless communication device and said first other device, a second ToF measurement between said wireless communication device and said second other device, and a third ToF measurement between said first other device and said second other device.

5. The apparatus of claim 1, wherein said one or more other wireless communication devices include at least three other devices, and wherein said radio delay calibrator is to calibrate said radio delay of said wireless communication device based on at least three ToF measurements between said wireless communication device and said at least three other devices, and based on a plurality of ToF measurements between a plurality of different pairs of said at least three other devices.

6. The apparatus of claim 1, wherein said one or more messages comprise one or more messages selected from the group consisting of an is-calibrated message from a particular device of said one or more other wireless communication devices and a Time of Flight (ToF) calibration message from said particular device, wherein the is-calibrated message indicates whether or not one or more delay parameters of at least one radio of said particular device are calibrated, and wherein said ToF calibration message includes timing information of a ToF measurement performed by said particular device.

7. The apparatus of claim 1, wherein said one or more other wireless communication devices include one or more devices selected from the group consisting of a mobile device and a stationary device.

8. The apparatus of claim 1, wherein said radio delay of said wireless communication device comprises at least a Radio-Frequency (RF) path delay of said wireless communication device.

9. A system comprising: a wireless communication device including: one or more antennas; and a wireless communication unit including a radio to transmit a calibration request to a first other wireless communication device, the calibration request indicating at least a second other wireless communication device, and to receive from the first other wireless communication device a calibration response including timing information of a Time of Flight (ToF) measurement between said first and second other wireless communication devices.

10. The system of claim 9, wherein said wireless communication unit is to calibrate at least one radio delay of said radio based on said calibration response.

11. The system of claim 10, wherein said wireless communication unit is to calibrate said radio delay of said radio based on a ToF measurement between said wireless communication unit and said first other wireless communication device, a ToF measurement between said wireless communication device and said second other wireless communication device, and the ToF measurement between said first and second other wireless communication devices.

12. The system of claim 10, wherein said wireless communication unit is to calibrate said radio delay of said radio based on at least three ToF measurements between said wireless communication device and at least three other devices including said first and second other wireless communication device, and based on a plurality of ToF measurements between a plurality of different pairs of said at least three other devices.

13. The system of claim 9, wherein said wireless communication unit is to transmit a calibration query to said first other wireless communication device, and, in response to said calibration query, to receive from said first other wireless communication device a query response indicating whether or not one or more delay parameters of at least one radio of said first other wireless communication device are calibrated.

14. The system of claim 13, wherein said query response includes an indication of a degree of calibration of said radio of said first other wireless communication device.

15. The system of claim 9, wherein said first and second other wireless communication devices include one or more devices selected from the group consisting of a mobile device and stationary device.

16. A system comprising: a wireless communication device including: one or more antennas; and a wireless communication unit including a radio to receive a calibration request from a first other wireless communication device, the calibration request indicating at least a second other wireless communication device, and to transmit to said first other wireless communication device a calibration response including timing information of a ToF measurement between said wireless communication unit and said second other wireless communication device.

17. The system of claim 16, wherein said first and second other wireless communication devices include one or more devices selected from the group consisting of a mobile device and stationary device.

18. A method comprising: communicating one or more calibration messages between a wireless communication device and one or more other wireless communication devices, the calibration messages including calibration information, which is based on radio delays of said one or more other wireless communication devices; and calibrating a radio delay of said wireless communication device based on said calibration information, wherein communicating said calibration messages comprises transmitting to a first other wireless communication device a Time of Flight (ToF) measurement calibration request indicating at least a second other wireless communication device.

19. The method of claim 18, wherein communicating said calibration messages comprises receiving a Time of Flight (ToF) calibration response including timing information of a ToF measurement between the first and second other wireless communication devices.

20. The method of claim 18, wherein communicating said calibration messages comprises transmitting a query message to query a particular other wireless communication device, and receiving a response message indicating whether a radio delay of the particular wireless communication device is calibrated.

21. The method of claim 18, wherein said calibrating comprises calibrating said radio delay of said wireless communication device based on a first ToF measurement between said wireless communication device and said first other wireless communication device, a second ToF measurement between said wireless communication device and said second other wireless communication device, and a third ToF measurement between said first other wireless communication device and said second other wireless communication device.

22. A product including a non transitory storage medium having stored thereon instructions that, when executed by a machine, result in: transmitting a calibration request from a first wireless communication device to a second wireless communication device, the calibration request indicating at least a third wireless communication device; receiving a calibration response from the second wireless communication device at the first wireless communication device, the calibration response including timing information of a Time of Flight (ToF) measurement between said second and third wireless communication devices; and calibrating a radio delay of said first wireless communication device based on said ToF measurement between said second and third wireless communication devices.

23. The product of claim 22, wherein said instructions result in: performing a ToF measurement between said first and second wireless communication devices; performing a ToF measurement between said first and third wireless communication devices; and calibrating the radio delay of said first wireless communication device based on said ToF measurement between said first and second wireless communication devices, said ToF measurement between said first and third wireless communication devices, and said ToF measurement between said second and third wireless communication devices.

24. The product of claim 22, wherein said radio delay includes at least a Radio-Frequency (RF) path delay of said first wireless communication device.

* * * * *